United States Patent [19]

Guez

[11] Patent Number: 4,651,313
[45] Date of Patent: Mar. 17, 1987

[54] METHOD AND APPARATUS FOR WRITING INFORMATION ON PROCESSED PHOTOGRAPHIC FILM

[76] Inventor: Moshe Guez, 96 Jerusalem Boulvard, Ramat-Gan, Israel

[21] Appl. No.: 610,937

[22] Filed: May 17, 1984

Related U.S. Application Data

[63] Continuation-in-part of Ser. No. 592,933, Mar. 23, 1984, abandoned.

[30] Foreign Application Priority Data

Mar. 24, 1983 [IL]  Israel .................................. 66817

[51] Int. Cl.⁴ .......................... G11B 3/64; G11B 7/20
[52] U.S. Cl. ..................................... 369/14; 369/121; 369/118; 369/125; 369/100; 369/85; 369/104; 346/76 L
[58] Field of Search ............... 369/121, 122, 118, 119, 369/14, 125, 100, 85, 84, 15, 284, 285, 104; 346/76 L

[56] References Cited

U.S. PATENT DOCUMENTS

| | | | |
|---|---|---|---|
| 2,468,049 | 4/1949 | Dimmick | 369/118 |
| 3,246,085 | 4/1966 | Rabinow | 369/85 |
| 3,474,457 | 10/1969 | Becker | 346/76 L |
| 3,518,925 | 7/1970 | Chitayat | 95/1.1 |
| 3,588,439 | 6/1971 | Heller | 346/76 |
| 3,632,205 | 1/1972 | Marcy | 355/53 |
| 3,865,996 | 2/1975 | Kato | 369/121 |
| 4,087,651 | 5/1978 | Taneda | 369/119 |
| 4,225,224 | 9/1980 | Balasubramanian | 346/76 L |

OTHER PUBLICATIONS

*A Handbook of Sound Recording*, by Honore ©1980, pp. 81–85, 126–136, 174–181.
"Square Blue Laser Focus Ultraviolet Energy", by J. Schefter, Pop. Sci., May 1983.

*Primary Examiner*—Alan Faber
*Attorney, Agent, or Firm*—Wolf, Greenfield & Sacks

[57] ABSTRACT

A system and a method for applying a sound track to cinematic film by means of a modulated laser beam.

6 Claims, 5 Drawing Figures

METHOD AND APPARATUS FOR WRITING INFORMATION ON PROCESSED PHOTOGRAPHIC FILM

This application is a continuation-in-part, of application Ser. No. 592,933, filed Mar. 23, 1984, now abandoned.

FIELD OF THE INVENTION

This invention relates to a method and apparatus for writing information on exposed photographic film. Such information may include sound tracks for cinematic film or alpha-numeric characters for still photographic film.

BACKGROUND OF THE INVENTION

In many situations it is necessary to write information on photographic film after the film has been exposed and developed. Such situations arise in the motion picture industry in dubbing or reprinting cinematic films and in other industries where photographic film or microfilm are cataloged after processing.

For example, a typical situation occurs after a given cinematic film is received with its original sound track which contains the music as well as the spoken dialogue. When the language used is to be substituted by another one, there has first to be prepared a translation both according to the content of the dialogue, and also according to the number of syllables spoken, as otherwise a strange and unnatural effect is obtained.

In the present state of the recording art there are several methods for applying the new dialogue to the existing cinematic film. The first step in all prior art methods is to record the translated dialogue with a audio magnetic tape recorder. Well-known methods are used to synchronize the recorded dialogue to the actor's lip movements in the existing film. The resulting audio tape is normally called the new magnetic dialogue.

The new magnetic dialogue is now mixed with prerecorded, synchronized music and special sound effects in a well-known manner and re-recorded creating a composite final mix tape.

In order to prepare a commerical cinematic film including a picture and synchronized audio track, the audio signal on the final mix tape is transferred to the cinematic film by means of one of several methods.

One early methods was to use a composite film which had a magnetic sound track on the edge of a normal cinematic copy film. The audio information could then be directly recorded on the film from the final mix tape either before or after the film had been exposed. This method was commercially impractical because the magnetic sound track could easily be erased or damaged during handling or distribution, and the magnetic sound track could not be read by most existing projection equipment.

Another prior art method was to prepare an optical sound track with the final mix audio information by photographically exposing the optical sound track prior to processing of the film by means of a process called electroprinting. This process involved exposing the emulsion directly on the copy print stock by means of a light source passing through a narrow, variable-area slit located in front of the sound track area on the film. The area of the slit is modulated by the recorded audio information by means of a moving wedge which is driven by the audio signal. The problem with the electroprint system was that it could not produce a optical sound track with a satisfactory quality because the quality of the track depended on a number of variables which affected the contrast of the resulting track. Many of these variables could not be accurately controlled such as, processor contrast control, developer formula, temperature and exposure time. In addition the quality of the finished optical track required a fine grain, high-contrast emulsion and such an emulsion was not ordinarily used in the picture area of either positive or negative cinematic copy film.

In order to avoid some of the problems with the electroprint process multiple step processing procedures were used. In one procedure the picture area of the copy print film is exposed and developed. The sound track area is then recoated with a special fine grain, high-contrast emulsion. The optical sound track is then exposed and the sound track emulsion is then developed separately from the picture area. Due to the special treatment required, this method did not produce predictable results and the resulting sound tracks were not of high quality. Consequently the process is not used any longer.

Another process used to transfer the optical information to the photographic film is called optical printing on internegative film. In order to use the internegative process with normal copy film, the sound track is applied to the photographic film in two steps. First the magnetic track is tranferred and exposed on special film which has a fine grain and high contrast emulsion. The sound information is exposed in the optical track area but the film remains clear in the picture area. The original negative picture is separately printed on another negative film (the internegative) leaving a clear optical track area. Finally, the optical track and the internegative picture image are printed onto positive copy stock by contact printing to produce the cinematic film answer print.

Two methods have commonly been used with the internegative process to convert the sound information into an optical track. In one method, called the variable density method, the optical track emulsion is exposed by means of a light passing through a narrow slit in front of the sound track area of the film. the intensity of the light is varied by modulating the light source by the audio information. The problem with the variable density method is that it could not produce sound tracks of predictable quality since the resulting optical track had a continuous grey-scale ranging from clear to opaque. Thus, the quality of the processed track depends on proper exposure and various processing variables as well as fine-grain film.

The second method of converting the audio information to an optical sound track is the variable area method. The variable area method also involves exposing the emulsion by means of a light source passing through a small slit located in front of the film. However, in the variable area process the intensity of the light source is kept constant and the area of the slit is changed by a moving wedge controlled by the audio information. The resulting sound track can also be read by conventional projection equipment, but also requires high contrast emulsion on the optical track of copy print to produce a high-quality track.

Because the internegative process with variable area conversion produces a high-quality optical track on normal copy stock, it is the current method used to process copies. But, due to the necessity of a synchronizer to synchronize the printing of the optical track with the picture negative, the method is cumbersome and expensive. Furthermore it is useful only for a certain number of copies at least, as otherwise it is too expensive. Generally nowadays such films can be prepared only at the original film studios and the availability of the dubbed films depends on the capacities of such studios.

SUMMARY OF THE INVENTION

The foregoing problems are solved in one illustrative embodiment of the invention in which information including, sound track information and/or alpha-numeric character information, is written onto exposed and developed photographic film by means of a laser beam. The film is initially processed with an opaque optical sound track area and the sound information is written onto the optical track area by vaporising the emulsion in selected portions of the optical track area by means of a laser beam.

The laser beam can be used to apply the required sound track to any type of cinematic film (negative or positive, black or color), Super-8, 16, 35 or 70 mm. etc., and this by economical means which make possible the production of a small number of such films by simple means. A wide variety of lasers is available, and it is a matter of choice to select a suitable one according to the nature and material of the film and the required effects.

The first steps of the process of the invention are identical with the first steps of the conventional process, namely there is obtained a copy of the original film with the original sound track; there is ordered a copy of the magnetic tape of the music and sound effects, there is carried out a sound-by-word translation of the dialogue, taking care to end up with the same numbers of syllables in each sentence in the translation, recording the translation of the dialogue and recording this on a suitable magnetic tape.

The new magnetic recording is used to steer and control a transfer optics system which modulates a laser beam which is used to record the desired sound track on a copy of the original film an empty dark, opaque sound track, ordered for this purpose.

For producing a new sound rack, the composite final mix sound track is used to control a variable area slit mechanism (called a "galvanometer"mask) similar to those used in prior art variable area recording techniques to vaporize a variable area sound track on the processed film. Alternatively, to produce alpha-numeric characters, the laser beam is directed through a rotatable disk containing character outlines in the same manner as performed by well-known phototypsetting systems. In either of the latter two processes, the laser beam is kept at a constant intensity.

Due to the nature of the laser beam, such sound track can be applied directly onto the finished black-and-white or color film. It is of course possible also to apply this sound track to an intermediate negative of the original film and to print from same further copies with the correct sound track.

It is also possible to use the original positive cinematic film, to render the existing sound track opaque and to record in its stead the new one.

As the sound track can be applied by means of the modulated laser beam to the final positive film, it is economical to produce a limited number of copies. No special laboratories are required and this can be done even in daylight. The new sound track can be applied to any existing type of cinematic films.

More particularly, according to the invention, in order to write a new sound track onto the film, the electrical signal from a magnetic tape recorder containing the final composite mix tape is used to control a galvanometer mask. Constant intensity light from a laser passes through the mask and is focussed, via a suitable optical system, onto a film in a standard film transport. The tape recorder and the film transport are synchronized by well-known means so that the laser light vaporizes the emulsion in the sound track area producing a synchronized sound track having a high signal-to-noise ratio.

DETAILED DESCRIPTION OF THE PREFERRED EMBODIMENTS

Figure 1:
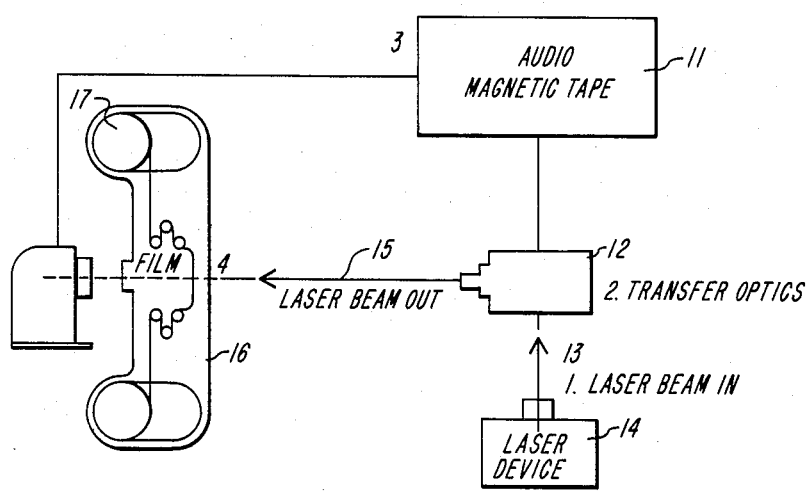
FIG. 1 is a schematic diagram of a system for writing a sound track on cinematic film in accordance with the invention.

A system according to the present invention is illustrated in FIG. 1, which system comprises in combination an audio magnetic tape 11 which is used to control and steer the transfer optics 12 whereby the continuous laser beam 13 coming from laser 14 is modulated and the modulated beam 15 is applied to the cinematic film 16 which is moved synchronously by the system 17 which is also connected to the device of the magnetic tape which steers the synchronization.

Figure 2:
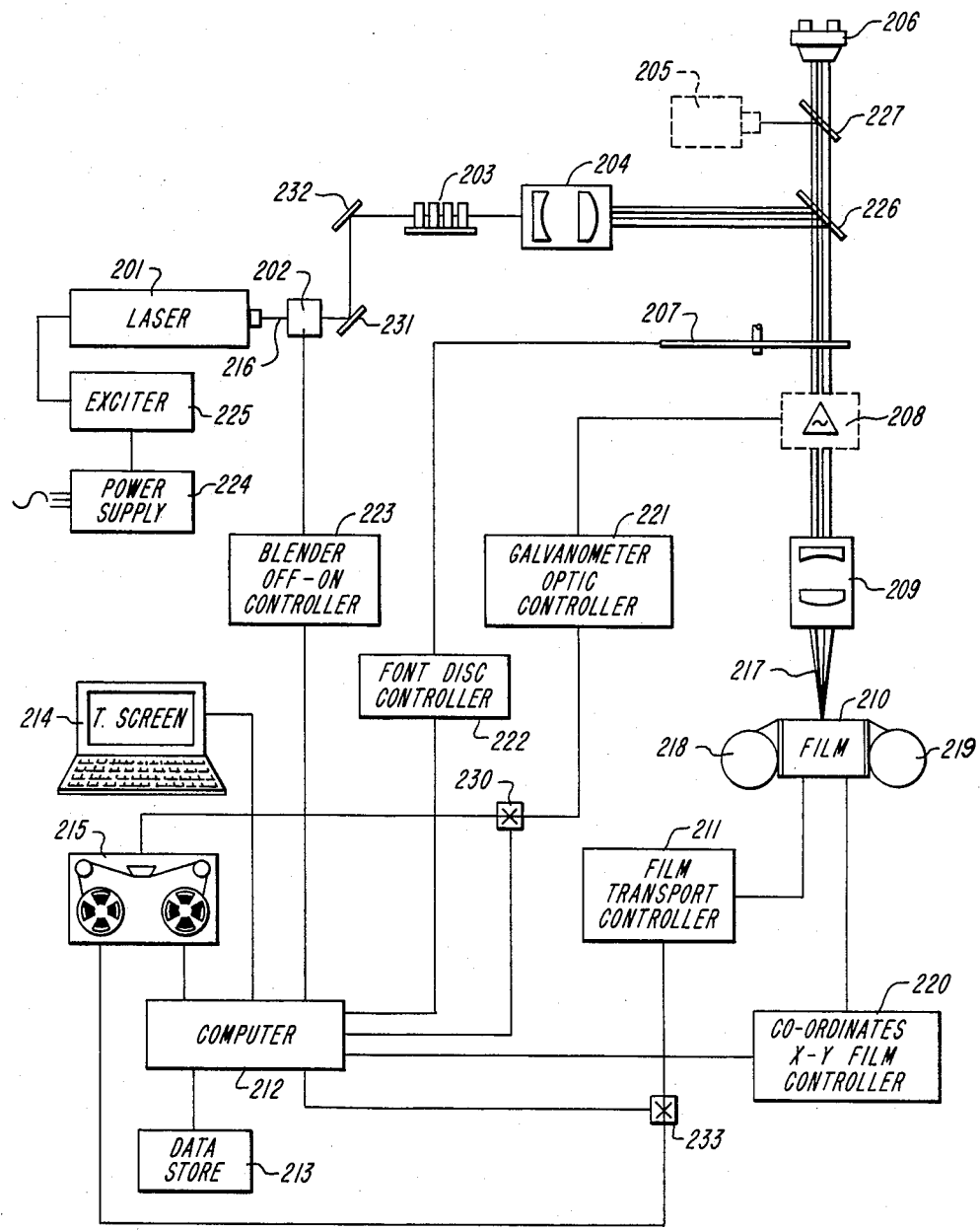
FIG. 2 is a schematic diagram of a combined system for writing a sound track on cinematic film and for writing alpha-numeric information on still photographic film.

FIG. 2 of the drawing illustrates a computer-controlled combined system for using a laser beam to either write an optical sound track on cinematic film or to write alpha-numeric characters on a piece of still photographic film.

The laser light used for marking the film is generated by laser 201. Laser 201 is operated in a well-known manner by an exciter 225 which receives power from power supply 224. The selection of laser 201 depends on the application for which the system is being used and the writing speed necessary.

For example, for a low speed system (approximately 30 mm. of sound track written per second or 10 characters written per second) a laser suitable for use with the illustrative embodiment is a Nd-YAG argon-ion laser. An example of such a laser is a model 5052 Nd-YAG laser manufactured by U.S. Laser Corporation, Waldwick, N.J. This laser has an adjustable power output up to 2 watts. For the illustrative embodiment the power output is adjusted to ⅛ watt power output. The laser is operated at 28 amps., 3000 Hz. The laser has a light output with a 1.06 micron wavelength. In order to use this laser with standard photographic film, the laser frequency must be increased by passing the laser beam through a harmonic generator, shown as generator 203 in FIG. 2. A harmonic generator is a well-known device which accepts an input light beam at a predetermined frequency and generates an output light beam with a frequency at a harmonic of the input frequency. For the illustrative embodiment a suitable harmonic generator is a green light harmonic generator which doubles the laser frequency causing a reduction in the 1.06 micron wavelength output produced by the laser to a 532 nm. wavelength.

For a faster rate of marking and heavy duty operation (speed approximately 35 characters or 105 mm sound track length per second), a laser suitable for use with the illustrative embodiment is a pulsed UV eximer laser. In this well-known type of laser the light output is created by a fast transverse electric discharge in a mixture of gases, including helium, fluorine and an appropriate rare gas. An eximer laser suitable for use with the illustrative embodiment is a model 2400 laser manufactured by Questec, Inc., Bedford, Mass. With this laser the output wavelength of the light depends on the rare gas used. For example, the laser develops an output with a wavelength of 193 nm. for an argon-fluorine gas mixture, A xenon-fluorine mixture produces and output wavelength of 351 nm. The best results with the illustrative embodiment have been obtained using a mixture of xenon and chlorine gas with an output wavelength of 308 nm. The laser is operated at 35 watts output, with a frequency of 0.2–100 Hz and a pulse energy of 350 millijoules per $cm^2$ and a 20-nanosecond pulse duration. The light output pulse rate is 175 pulses per second. A harmonic generator is not necessary for this laser.

The light output of the laser is passed through a blender shutter which is a mechanical shutter which can turn the beam on and off under control of the computer 212, via controller 223. From the blender shutter, the light beam is reflected via mirrors 231 and 232 to the harmonic generator 203 (if necessary). After passing through the harmonic generator the light beam passes through quartz, fused silica, anti-reflection coated lenses 204 which expand the spot size of the beam to a diameter of 1–2 cm. The expanded beam then passes to a dichroic beam splitter 226 which directs the main part of the beam to the film area. A small fraction of the beam energy is reflected in the opposite direction to a second splitter 227 which directs the light to a television camera 205 and/or a binocular eyepiece to permit direct viewing of the beam for focussing purposes.

From splitter 226, the main portion of the beam passes to the modulating portions of the optical system. For writing alpha-numeric characters a font disk 207 is used for modulating the beam. A galvanometer mask 208 is used for writing sound track information. Control of these devices by computer 212 will be discussed in more detail hereinafter.

Font disk 207 is a stencil disk containing cut-outs of the characters to be written in the appropriate font. The disk is specially made from a copper sheet laminated with a clear plastic film which is resistant to the heat of the laser beam and, therefore, does not distort, crumple, crack, burn or melt, and does not lose its transparency. The plastic is chosen to transmit most (up to 95%) of the spcific laser wavelength. Plastics suitable for use with the illustrative embodiment are ACLAR plastics, types 22A and 33C, manufactured by the Allied Chemical Corporation located in New Jersey. The purpose of laminating the plastic to the stencil mask is to adhere the center pieces of the enclosed letters such as "O", "p", "B", etc. and to permit the ability to design and create a wide range of artistic drawings on the mask which can be projected on the film via the laser beam.

Galvanometer 208 is a standard device which is the same as that presently used in variable area transfer system previously discussed.

The modulated laser beam is focused to a spot by an objective lens 209 onto the film located on table 210. The size of the spot depends on the image to be written.

For writing a sound track on the film, the cinematic film is placed on a standard film transport which moves the film between reels 218 and 219. For writing still film the film is placed on an X-Y table which can be moved precise distances in either the X or Y direction by means of stepper motors controlled by computer 212. Both the film transport and the X-Y table are standard components whose operation is well-known.

OPERATION OF THE SYSTEM FOR WRITING ALPHA-NUMERIC CHARACTERS

Alpha-numeric characters are written by the system under control of computer 212 using monitor screen 214, data store 213, font disk controller 222 and font disk 207. The tape recorder 215, galvanometer controller 221 and galvanometer mask 208 are not used. To avoid interference computer 212 opens switch 230 to disconnect controller 222 to cause it to open the mask 208 to its maximum opening.

Figure 3:
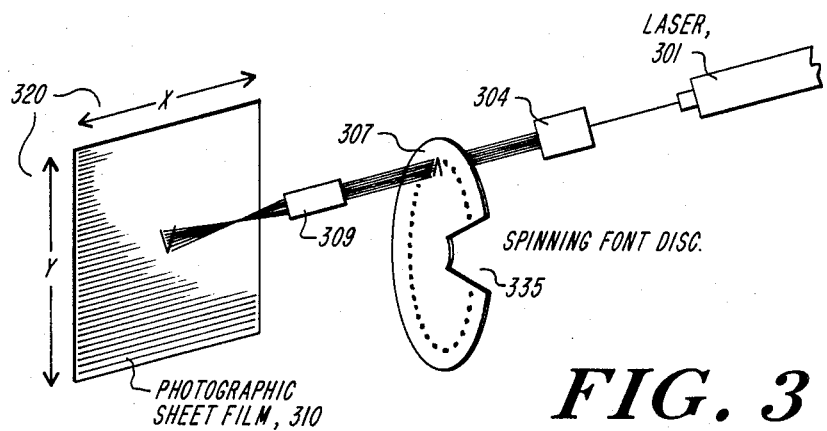
FIG. 3 is a simplied schematic diagram of the optical path of the system when operating in the character writing mode.

The optical path of the system when operating in the character writing mode is shown in FIG. 3. The light beam from laser 301 passes through harmonic generator 304 (if necessary), disk 307, focussing lens system 309 onto the film located on table 310. Table 310 may be moved in the X and Y direction 320 by means of motors (not shown).

Referring to FIG. 2, computer 212 controls the blender shutter (via controller 223) and font disk (via controller 222) to produce a sequence of alpha-numeric characters on appropriate positions on the film located on X-Y table 210. The operation of the computer 212 and its related controllers will not be described in detail herein. Similar systems are well-known in the phototypsetting field and the word-processing field.

The characters can be written in two ways. The first way is character-by-character. In this mode, as each character is typed on the keyboard of terminal 214, the computer controls the font disk to rotate to the proper position for placing the corresponding character stencil in the laser beam. Specifically, computer 212 generates coded digital signals which are converted into motor control signals by controller 222. When the disk has rotated to the proper position, computer 212 causes shutter 2 to open via controller 224 to allow the laser beam to pass through the character stencil. Font disk 207 can either be continuously spinning or moved to the proper position upon command. In either case the shutter 202 is opened when the proper character is in position.

Figure 5:
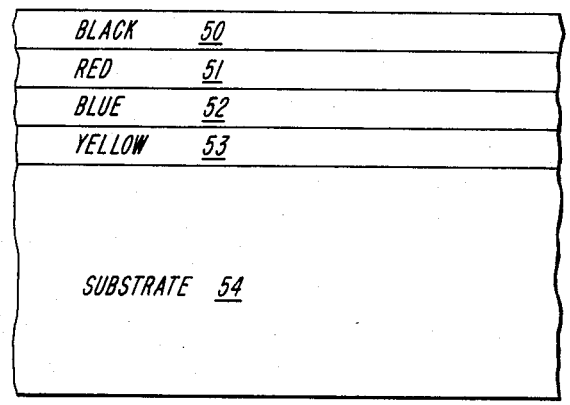
FIG. 5 is a cross-sectional diagram of a typical film emulsion showing the various emulsion layers.

The amount of time the shutter is open depends on the desired color of the resulting character. As shown in FIG. 5, a typical film emulsion is actually composed of several layers 50–53 on a clear substrate 54. The first layer is a layer of black emulsion 50. The next layers in succession are red 51, blue 52 and yellow 53. Each layer is approximately the same thickness and with a pulsed laser a predictable number of pulses are needed to vaporize each layer. For example, with a laser operating with a pulse frequency of 175 Hz, four pulses are required to vaporize each layer. Thus if the shutter is opened to allow 16 pulses to pass through, all of the emulsion will be vaporized resulting in a clear character being written on the film. Alternatively, if only 12 pulses are allowed to pass through, the top three emulsion layers, 50–52, will be vaporized resulting in a character with a yellow color. Due to the low power of the laser, if more than 16 pulses are applied to the film, the clear substrate will not be damaged by the beam.

As each character is exposed, the computer 212 simultaneously generates digital signals which cause the coordinate controller 220 to move the film on table 210 to the proper location.

The system can also be operated in a batch method. In this method the characters to be written are first entered into the data store 213. When all of the characters to be printed have been entered (and any editing has been done) then character codes are retrieved from the data store 213 and used by computer 212 to control the font disk 207 to write all of the stored characters at once.

OPERATION OF THE SYSTEM FOR WRITING SOUND TRACKS

When the system is to be used to write sound tracks on cinematic film, computer 212 closes switches 230 and 233. Switch 230 connects the audio output of recorder 215 (the final composite mix) to controller 221. The galvanometric mask 208 is then controlled by the audio signal in a well-known manner. Similarly, when switch 233 is closed the film transport controller 211 is connected to the tape transport mechanism. Well-known arrangements then synchronize the two transports to insure synchronism between the recorded dialogue and the picture. The operation of the mask 208 and the synchronization of controllers are well-known and described in detail in *Handbook of Sound Recording* by Paul M. Honore, Calif., 1980. When operating in the sound track mode, computer 212 causes font disk 207 to be rotated so that the laser beam passes through slot 335 in disk 307 (FIG. 3) to avoid interference from the font disk.

Figure 4:
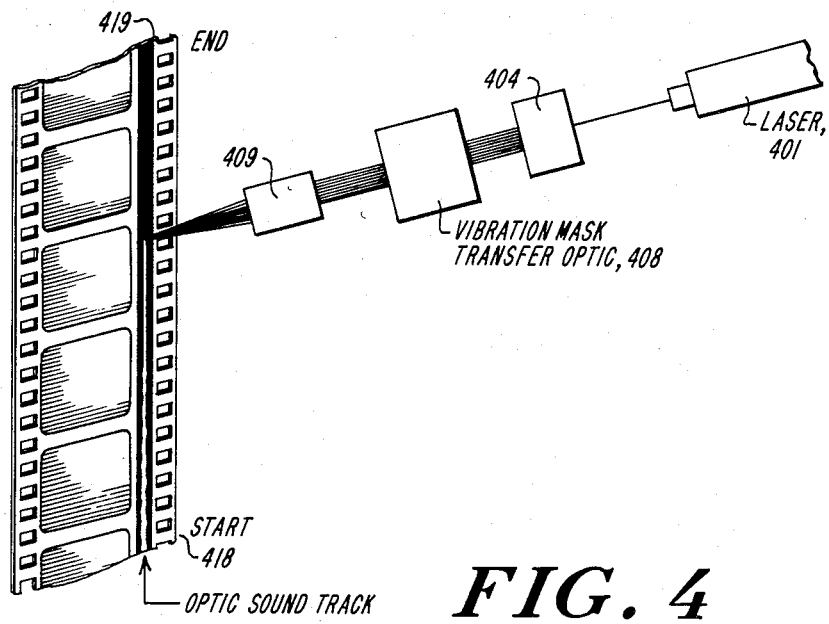
FIG. 4 is a simplied schematic diagram of the optical path of the system when operatin in the sound track writing mode.

The optical path of the system when operating in the sound track mode is shown in FIG. 4. The light beam from laser 401 passes through the harmonic generator 404 (if necessary) and is modulated by galvanometer mask 408. The modulated light beam is then focussed onto the film in the film transport. The sound track is written from the beginning of the film 418 in the forward direction to the end 419.

Another method for writing the optical track with a sound track would be to utilize a laser with a very small spot size. The laser beam is then optically or electronically scanned transversely across the optical sound track area at a constant frequency which frequency is much higher than the writing rate. The audio information is used to modulate the laser beam, turning the beam on and off at appropriate times. The audio signals can be either used to directly modulate the laser beam or, alternatively, the audio signals can be digitized and the digital signals used to modulate the beam. When the beam is on it vaporizes a track across the sound track area. When the beam is off the track remains opaque.

I claim:

1. A method of writing sound track information on processed cinematic film having an emulsion layer on a substrate comprising the steps of:
    A. directing a laser to apply to said emulsion a light beam of sufficient frequency, intensity, area and duration to vaporize at least a portion of said emulsion without damaging said substrate,
    B. passing said light beam through a mask having variable area for light transmission, and
    C. varying the light transmission area of said mask by means of audio-frequency electric signal to generate an audio sound track on said film which sound track is readable by cinematic film projection equipment.

2. A method of writing information on processed film emulsion in accordance with claim 1 wherein step C comprises the additional steps of
    C1. preparing a magnetic tape recording of audio signals desired to be written onto said emulsion, and
    C2. converting said magnetic tape recording into electronic signals by reading said tape in a tape recorder.

3. A method of writing sound track information on a sound track area extending along the length of processed cinematic film having an emulsion layer on a substrate comprising the steps of:
    A. directing a laser to apply to said emulsion a light beam of sufficient frequency, intensity, area and duration to vaporize at least a portion of said emulsion without damaging said substrate,
    B. scanning the laser beam transversely across said sound track area in which information is to be written, and
    C. modulating said laser beam in response to said information to write a sound track on said film, which sound track is readable by cinematic film projection equipment.

4. Apparatus for writing sound track information on processed cinematic film having an emulsion layer on a substrate comprising,
    a laser,
    means for operating said laser to generate a light beam of sufficient frequency, area, intensity and duration to vaporize at least a portion of said emulsion without damaging said substrate,
    a mask having an opening of variable area therein, said mask being responsive to electrical signals for varying the area of said opening,
    an optical system for directing said light beam through said mask onto the sound track area of said film,
    means responsive to said sound track information for generating electrical signals corresponding to information to be written onto said emulsion, and
    means responsive to said electrical signals for controlling said mask to vary the area of its opening in accordance with said electrical signals to write a sound track on said film, which sound track is readable by cinematic film projection equipment.

5. Apparatus for writing information on processed film emulsion in accordance with claim 4 further comprising means responsive to said audio frequency electrical signals for relatively moving said film emulsion and said beam so that said information is written at different areas on said film.

6. Apparatus for writing sound track information on a sound track area extending along the length of processed cinematic film having an emulsion layer on a substrate comprising,
    a laser,
    means for operating said laser to generate a light beam of sufficient frequency, area, intensity and duration to vaporize at least a portion of said emulsion without damaging said substrate,
means for scanning said beam across transversely across said sound track area to be written, and
means responsive to said information for modulating said beam in patterns corresponding to information to be written onto said emulsion to write a sound track on said film, which sound track is readable by cinematic film projection equipment.

* * * * *